(12) United States Patent
Akyildiz et al.

(10) Patent No.: US 7,705,575 B2
(45) Date of Patent: Apr. 27, 2010

(54) STANDBY REGULATOR

(75) Inventors: Ahmet Akyildiz, Saratoga, CA (US);
Alexei Shkidt, Newark, CA (US)

(73) Assignee: SpectraLinear, Inc., Santa Clara, CA (US)

( * ) Notice: Subject to any disclaimer, the term of this patent is extended or adjusted under 35 U.S.C. 154(b) by 0 days.

(21) Appl. No.: 12/421,739

(22) Filed: Apr. 10, 2009

(65) Prior Publication Data

US 2009/0256547 A1    Oct. 15, 2009

Related U.S. Application Data

(60) Provisional application No. 61/044,016, filed on Apr. 10, 2008.

(51) Int. Cl.
*G05F 1/40*    (2006.01)
*G05F 1/10*    (2006.01)

(52) U.S. Cl. .................. 323/281; 323/274; 323/284; 327/544

(58) Field of Classification Search .............. 323/266, 323/273–275, 280, 281, 284, 285, 313, 314; 327/539, 540, 544
See application file for complete search history.

(56) References Cited

U.S. PATENT DOCUMENTS

| 5,483,152 | A  | * | 1/1996  | Hardee et al.  | 323/314 |
| 7,034,513 | B2 | * | 4/2006  | Gan et al.     | 323/285 |
| 7,049,797 | B2 | * | 5/2006  | Fukui et al.   | 323/281 |
| 7,148,742 | B2 | * | 12/2006 | Pan et al.     | 327/539 |
| 7,479,767 | B2 | * | 1/2009  | Kato           | 323/223 |

* cited by examiner

*Primary Examiner*—Jessica Han
(74) *Attorney, Agent, or Firm*—Townsend and Townsend and Crew LLP

(57) ABSTRACT

A standby regulator circuit includes a standby bias circuit and a standby operational amplifier. The standby regulator circuit provides a standby regulated control voltage to a multiplexer. A regular operational amplifier provides a regulated control voltage to the multiplexer. During regular operation, the multiplexer selects the regular operational amplifier and selects the standby regulator circuit in a low-power mode. The multiplexer couples to a native pass transistor gate having a threshold voltage about equal to 0 V. The native pass transistor provides a regulated output voltage with relatively low-level input control voltages. In low-power mode, a power-down signal, provided to the multiplexer, smoothly transitions regulated control voltage from the regular operational amplifier to regulated control voltage sourcing from the standby operational amplifier. In low-power operation regular operational amplifier power is saved and the standby operational amplifier is appropriate for regulating the low threshold voltage native pass transistor.

33 Claims, 10 Drawing Sheets

US 7,705,575 B2

STANDBY REGULATOR

CROSS-REFERENCES TO RELATED APPLICATIONS

This application claims priority from U.S. Provisional Patent Application No. 61/044,016, filed Apr. 10, 2008, entitled "STANDBY REGULATOR", which is hereby incorporated by reference, as if set forth in full in this document, for all purposes.

BACKGROUND

The present invention relates generally to integrated circuits, and more particularly to standby regulator circuits.

As process dimensions for integrated circuits continue to shrink, the maximum operating voltages of the circuits may decrease correspondingly. It may be desirable to decrease operating voltages to prevent large electric fields from damaging circuit structures, such as gate oxide, diffusion depletion regions, and various insulating layers. However, in many applications, the integrated circuits are coupled to external systems having operating voltages that may not have decreased as rapidly. Therefore, integrated circuits manufactured in advanced semiconductor technologies may typically include voltage regulators which are supplied with high-level voltages. The voltage regulators may operate to output a lower voltage that is compatible with a maximum operating voltage of a supplied semiconductor technology.

In addition, it may be desirable in many applications to reduce system power, for example, to manage thermal and battery-powered operating budgets. Reducing system power may involve designing circuits to draw minimum amounts of current. Traditionally, average operating currents may be lowered by providing power-down modes. In a power-down mode, portions of a circuit are inactivated when not required to operate. However, even when portions of the circuit are inactivated, regulators supplying these circuits may typically continue operating and drawing current. For example, the voltage these regulators supply stays below the maximum allowable by the technology, but high enough to keep portions of the circuit alive and stable in a particular state (e.g., as a "keep-alive" function). By continuing to operate in a powered-down mode, these regulators may continue to draw substantial operating current, which may be inefficient.

BRIEF SUMMARY

Among other things, embodiments of the invention include systems and methods for providing efficient voltage regulation in power-down, or standby, mode. In accordance with some embodiments of the invention, two biasing modules are provided for biasing the amplifier stage of the regulator. One biasing module is a high-power, high-accuracy biasing source (e.g., generated externally to the regulator) and the other biasing module is a low-power, low-accuracy biasing module. On power-down, the low-power biasing module starts up and begins generating a low-power reference level for the amplifier stage of the regulator. When the low-power reference level is available (e.g., stabilized), the regulator switches over to using the low-power reference level. The high-power reference level may then be shut down.

In certain embodiments, the amplifier stage of the regulator includes two amplifiers. A first amplifier is in communication with the low-power biasing module, and a second amplifier is in communication with the high-power biasing module. In one embodiment, the first amplifier is a lower power amplifier than the second amplifier. On power-down, when the low-power reference level is available, the regulator switches over to using the low-power reference level and the first amplifier. The high-power reference level and the second amplifier may then be shut down.

In some embodiments, a keeper module (e.g., including a low-power biasing module and an amplifier module) is configured to draw less current than the lowest powered regulators in regular operation. The keeper module provides safe voltage to circuits that are in a power-down mode. A native pass transistor is implemented in a source follower configuration as an output voltage regulator transistor. The low threshold voltage of the native pass transistor produces output voltage regulation at low-level regulation control input voltages. Additionally, a methodology is included to smoothly transition between the main regulator and the standby regulator so that maximum voltages are not exceeded.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components (e.g., a lower-case character). If only the first reference label is used in the specification, the description is applicable to any one of the similar components having the same first reference label irrespective of the second reference label.

DETAILED DESCRIPTION

Among other things, embodiments of the invention include systems and methods for providing efficient voltage regulation in power-down, or standby, mode. In accordance with some embodiments of the invention, two biasing modules are provided for biasing the amplifier stage of the regulator. One biasing module is a high-power, high-accuracy biasing source (e.g., generated externally to the regulator) and the other biasing module is a low-power, lower-accuracy biasing module. On power-down, the low-power biasing module starts up and generates a low-power reference level for the amplifier stage of the regulator. When the low-power reference level is available (e.g., stabilized), the regulator switches over to using the low-power reference level. The high-power reference level may then be shut down.

Figure 1A:
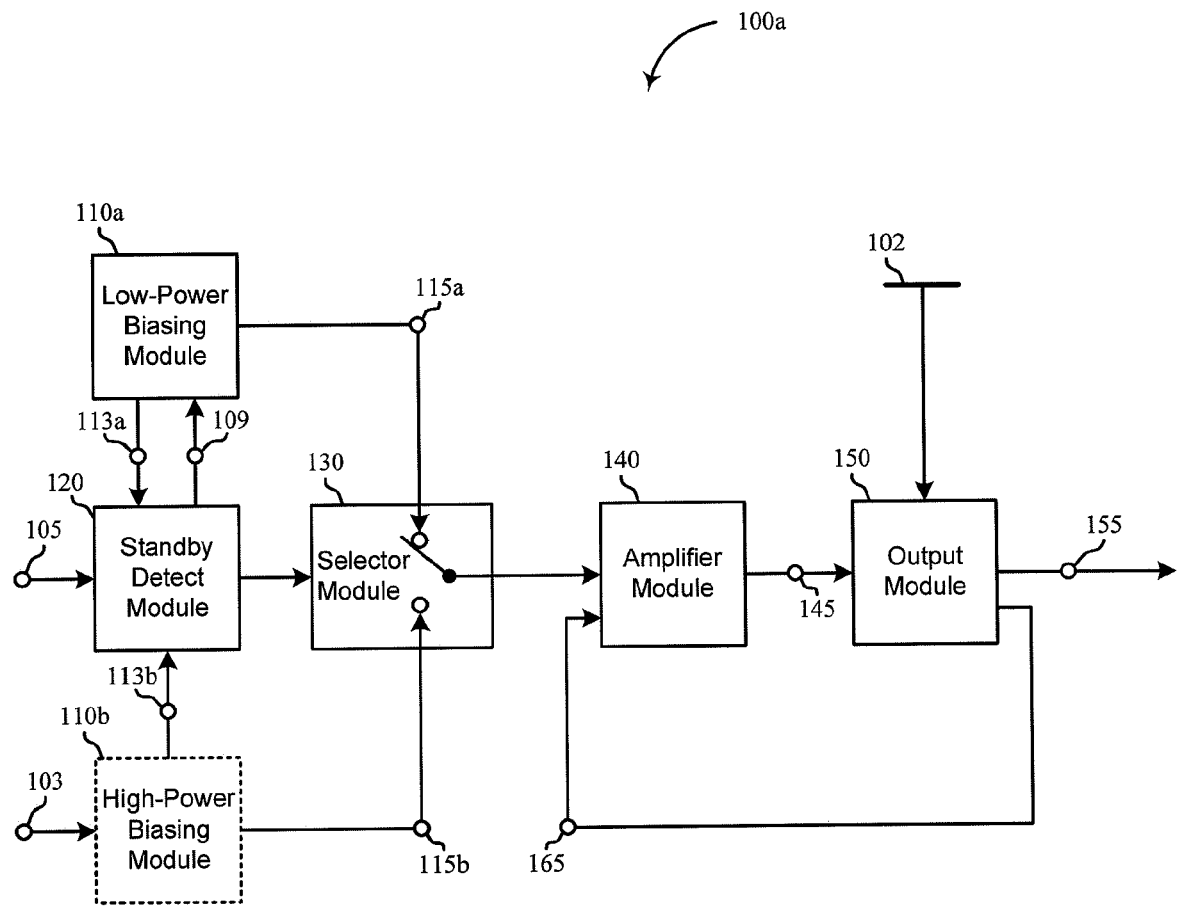
FIG. 1A, a functional block diagram is shown for an embodiment of a voltage regulator system, according to various embodiments of the invention.

Turning first to FIG. 1A, a functional block diagram is shown for an embodiment of a voltage regulator system 100a, according to various embodiments of the invention. The voltage regulator system 100a includes two biasing modules 110, a standby detect module 120, a selector module 130, an amplifier module 140, and an output module 150. The voltage regulator system 100a is operable to receive a source voltage 102, and regulate the source voltage 102 to output a lower level output voltage 155.

Embodiments of the voltage regulator system 100a substantially maintain the regulated output voltage 155 in both "power-up" (e.g., regular operation) mode and "power-down" (e.g., standby operation) mode. For example, the voltage regulator system 100a may be part of a larger system having external components, like memory components and clock components. In regular operation, it may be desirable for the clock and memory components to operate, and the clock components may rely on a highly accurate regulated output voltage 155. In standby mode, the clock components may shut down, but it may still be desirable to maintain a regulated (e.g., though maybe not as accurately regulated) output voltage 155 for keeping certain components operational.

As shown in FIG. 1A, the output module 150 receives the source voltage 102 and outputs the output voltage 155. The output of the output module 150 (e.g., the output voltage 155) is regulated by an amplifier output signal 145 generated by the amplifier module 140. In some embodiments, the amplifier module 140 includes an operational amplifier or other component for providing feedback regulation of the output module 150. The feedback for the amplifier module 140 is provided by a feedback signal 165, generated by components of the output module 150. In certain embodiments, the feedback signal 165 is tied to the output voltage 155. In other embodiments, the feedback signal 165 is a function of the output voltage 155 (e.g., the output voltage 155 is passed through a resistor divider to generate a stepped down feedback signal 165).

Embodiments of the amplifier module 140 compare the feedback signal 165 against a reference biasing signal 115. For example, in one embodiment, the amplifier module 140 includes an operational amplifier having a positive input terminal and a negative input terminal. The negative input terminal receives the feedback signal 165 and the positive input terminal receives the reference biasing signal 115, such that the operational amplifier can regulate in negative feedback. In certain embodiments, the amplifier module 140 is configured to use relatively low amounts of power.

In some embodiments, the reference biasing signal 115 is selected from multiple sources by the selector module 130. In power-down mode, a first reference biasing signal 115a is selected, and, in power-up mode, a second reference biasing signal 115b is selected. The first reference biasing signal 115a is generated by a low-power biasing module 110a. The low-power biasing module 110a is operable to generate the first reference biasing signal 115a to be good enough to provide adequate output voltage 155 regulation in power-down mode, while using a relatively low amount of power. The second reference biasing signal 115b is generated by a high-power biasing module 110b. The high-power biasing module 110b is operable to generate the second reference biasing signal 115b to be of relatively high accuracy for providing adequate output voltage 155 regulation in power-up mode.

It will be appreciated that references herein to "accuracy" with regards to a reference level are intended to broadly encompass various types of improved performance. For example, higher accuracy reference levels may include reference levels that manifest better DC and AC power-supply rejection, lower noise, higher stability, etc. Achieving these higher accuracy references may typically involve circuits that use more power and/or more area to implement. In many applications, higher accuracy reference levels are not needed in power-down (standby) mode, for example, because some active circuits (e.g., except static logic and memory) may be disabled. As such, in order to provide a more accurate reference, the high-power biasing module 110b may use a significantly higher amount of power and/or area than the low-power biasing module 110a. Embodiments of the high-power biasing module 110b are either external to the voltage regulator system 100a or receive an external bias signal 103 from another biasing module that is external to the voltage regulator system 100a. For example, the high-power biasing module 110b may receive an accurate bias current as the external bias signal 103, and convert the external bias signal 103 current to the second reference biasing signal 115b.

Embodiments of the selector module 130 are controlled by a standby detect module 120. The standby detect module 120 is configured to receive one or more standby detect signals 105 that direct the voltage regulator system 100a to enter power-down or power-up mode. For example, in regular power-up mode, the output voltage 155 is regulated by the amplifier module 140 configured to use the second reference biasing signal 115b from the high-power biasing module 110b (e.g., the selector module 130 is configured to pass the second reference biasing signal 115b to the reference input of the amplifier module 140). When the standby detect signals 105 indicate that the voltage regulator system 100a should enter power-down (e.g., standby) mode, the standby detect module 120 may communicate a power-down bias signal 109 to the low-power biasing module 110a. It is worth noting that the power-down bias signal 109 may, in fact, be a power-up signal for the components used in the power-down mode (e.g., the low-power biasing module 110a).

The low-power biasing module 110a may begin to generate the first reference biasing signal 115a. When the first reference biasing signal 115a is ready for use by the amplifier module 140 (e.g., the first reference biasing signal 115a has stabilized, has exceeded a threshold value, etc., as explained more below), the low-power biasing module 110a may communicate a low-power reference ready signal 113a back to the standby detect module 120. In response to receiving the low-power reference ready signal 113a, the standby detect module 120 may direct the selector module 130 to switch, so as to couple the reference input of the amplifier module 140 with the first reference biasing signal 115a instead of with the second reference biasing signal 115b.

In certain embodiments, the standby detect module 120 may further signal the high-power biasing module 110b to shut down. In embodiments where the high-power biasing module 110b is receiving the external bias signal 103 from an external biasing module, the standby detect module 120 may signal the external biasing module that it is now safe to shut down. In this way, the output voltage 155 may continue to be regulated during the transition from power-up mode to power-down mode. Further, in power-down mode, the output voltage 155 regulation may continue as a function of the first (e.g., low-power) reference biasing signal 115a, while allowing higher power components and systems to be shut down.

At some later time, the system into which the voltage regulator system 100a is integrated may be powered back up. The standby detect signals 105 may indicate that the voltage regulator system 100a should enter power-up (e.g., regular) mode, and the standby detect module 120 may further receive an indication that the second reference biasing signal 115b is ready to be used by the amplifier module 140. For example, when the second reference biasing signal 115b is stable, the standby detect module 120 may receive a high-power reference ready signal 113b. When the second reference biasing signal 115b is ready, the standby detect module 120 may direct the selector module 130 to switch, so as to couple the reference input of the amplifier module 140 with the second reference biasing signal 115b instead of with the first reference biasing signal 115a.

Once the selector module 130 has switched away from using the first reference biasing signal 115a, the standby detect module 120 may communicate the power-up condition to the low-power biasing module 110a (e.g., via the power-down bias signal 109, by switching the level from HIGH to LOW, by transmitting a pulse, etc.). The low-power biasing module 110b may then shut down. Again, the output voltage 155 may continue to be regulated during the transition from power-down mode to power-up mode. Further, in power-up mode, the output voltage 155 regulation may be more accurate (e.g., and may use more power) as a function of the second (e.g., higher-power) reference biasing signal 115b.

Figure 1B:
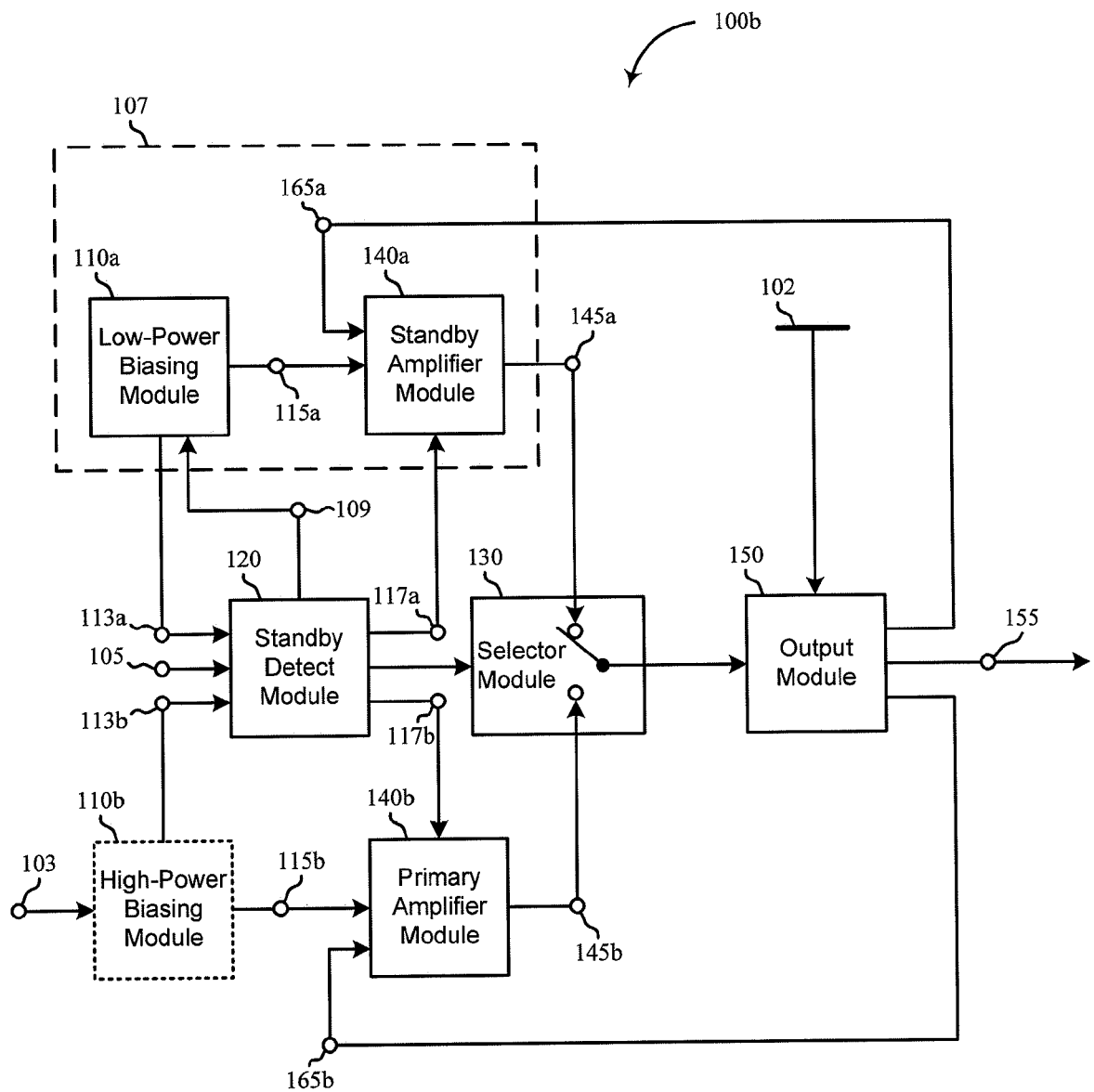
FIG. 1B, a functional block diagram is shown for another embodiment of a voltage regulator system, according to various embodiments of the invention.

Turning first to FIG. 1B, a functional block diagram is shown for another embodiment of a voltage regulator system 100a, according to various embodiments of the invention. The voltage regulator system 100b includes two biasing modules 110, a standby detect module 120, a selector module 130, two amplifier modules 140, and an output module 150. The voltage regulator system 100b is operable to receive a source voltage 102, and regulate the source voltage 102 to output a lower level output voltage 155.

Embodiments of the voltage regulator system 100b substantially maintain the regulated output voltage 155 in both "power-up" (e.g., regular operation) mode and "power-down" (e.g., standby operation) mode, as in the voltage regulator system 100a of FIG. 1A. As shown in FIG. 1B, the output module 150 receives the source voltage 102 and outputs the output voltage 155. The output of the output module 150 (e.g., the output voltage 155) is regulated by one of two amplifier modules 140, as selected by the selector module 130. In some embodiments, each of the amplifier modules 140 includes an operational amplifier or other component for providing feedback regulation of the output module 150. The feedback for each amplifier module 140 is provided by a feedback signal 165, generated by components of the output module 150. In certain embodiments, the feedback signal 165 is tied to the output voltage 155. In other embodiments, the feedback signal 165 is a function of the output voltage 155 (e.g., the output voltage 155 is passed through a resistor divider to generate a stepped down feedback signal 165).

Embodiments of the amplifier modules 140 compare the feedback signals 165 against reference biasing signals 115. For example, in one embodiment, the amplifier modules 140 each include an operational amplifier having a positive input terminal and a negative input terminal. Each negative input terminal receives a respective feedback signal 165 and each positive input terminal receives a respective reference biasing signal 115, such that each operational amplifier can regulate in negative feedback. Some embodiments include a standby amplifier module 140a and a primary amplifier module 140b. Certain embodiments of the standby amplifier module 140a are configured to be substantially identical to the primary amplifier module 140b; while other embodiments of the standby amplifier module 140a are configured differently from the primary amplifier module 140b. For example, the primary amplifier module 140b may be optimized for increased accuracy (e.g., lower offset voltage), for better power supply noise rejection, to use a different type of reference signal 115 or feedback signal 165, etc.

In some embodiments, the standby amplifier module 140a is configured to regulate as a function of a first feedback signal 165a and a first reference biasing signal 115a, and the primary amplifier module 140b is configured to regulate as a function of a second feedback signal 165b and the second reference biasing signal 115b. The first reference biasing signal 115a is generated by a low-power biasing module 110a. The low-power biasing module 110a is operable to generate the first reference biasing signal 115a to be good enough to provide adequate output voltage 155 regulation in power-down mode, while using a relatively low amount of power. In certain embodiments, the low-power biasing module 110a and the standby amplifier module 140a are part of a keeper system 107. The second reference biasing signal 115b is generated by a high-power biasing module 110b. The high-power biasing module 110b is operable to generate the second reference biasing signal 115b to be of relatively high accuracy for providing adequate output voltage 155 regulation in power-up mode. It will be appreciated that in order to provide a more accurate reference, the high-power biasing module 110b may use a significantly higher amount of power than the low-power biasing module 110a. Embodiments of the high-power biasing module 110b are either external to the voltage regulator system 100b or receive an external bias signal 103 from another biasing module that is external to the voltage regulator system 100b. For example, the high-power biasing module 110b may receive an accurate bias current as the external bias signal 103, and convert the external bias signal 103 current to the second reference biasing signal 115b.

The standby amplifier output 145a and the primary amplifier output 145b (e.g., the outputs of the standby amplifier module 140a and the primary amplifier module 140b, respectively) are connected with the selector module 130, such that the output module 150 is selectably controlled by one of the amplifier outputs 145 as a function of the selector module 130 setting. For example, in power-down mode, the standby amplifier output 145a (regulated as a function of the first reference biasing signal 115a) is selected and routed to the output module 150; and, in power-up mode, the primary amplifier output 145b (regulated as a function of the second reference biasing signal 115b) is selected and routed to the output module 150.

Embodiments of the selector module 130 are controlled by a standby detect module 120. The standby detect module 120 is configured to receive one or more standby detect signals 105 that direct the voltage regulator system 100b to enter power-down or power-up mode. In regular power-up mode, the output voltage 155 is regulated by the primary amplifier output 145b configured to use the second reference biasing signal 115b from the high-power biasing module 110b (e.g., the selector module 130 is configured to pass the primary amplifier output to the output module 150). When the standby detect signals 105 indicate that the voltage regulator system 100b should enter power-down (e.g., standby) mode, the standby detect module 120 may communicate a power-down bias signal 109 to the low-power biasing module 110a.

The low-power biasing module 110a may begin to generate the first reference biasing signal 115a. When the first reference biasing signal 115a is ready for use by the standby amplifier module 140a, the low-power biasing module 110a may communicate a low-power reference ready signal 113a back to the standby detect module 120. In response to receiving the low-power reference ready signal 113a, the standby detect module 120 may generate a power-down amplifier signal 117 to the standby amplifier module 140a. The standby amplifier module 140a may then start up and begin regulating as a function of the first reference biasing signal 115a. The standby detect module 120 may then direct the selector module 130 to switch, so as to connect the standby amplifier output 145a (rather than the primary amplifier output 145b) with the output module 150.

In certain embodiments, the standby detect module 120 may further signal the high-power biasing module 110b and/or the primary amplifier module 140b to shut down (e.g., via a second power-down amplifier signal 117b). In embodiments where the high-power biasing module 110b is receiving the external bias signal 103 from an external biasing module, the standby detect module 120 may signal the external biasing module that it is now safe to shut down. In this way, the output voltage 155 may continue to be regulated during the transition from power-up mode to power-down mode. Further, in power-down mode, the output voltage 155 regulation may continue as a function of the first (e.g., low-power) reference biasing signal 115a and the standby amplifier output 145a, while allowing higher power components and systems to be shut down.

At some later time, the system into which the voltage regulator system 100b is integrated may be powered back up. The standby detect signals 105 may indicate that the voltage regulator system 100b should enter power-up (e.g., regular) mode. The standby detect module 120 may further receive an indication that the second reference biasing signal 115b is ready to be used by the primary amplifier module 140b, and that the primary amplifier output 145b is ready to be used for controlling the output module 150. For example, when the second reference biasing signal 115b is stable, the standby detect module 120 may receive a high-power reference ready signal 113b. The standby detect module 120 may direct the selector module 130 to switch, so as to connect the primary amplifier output 145b (rather than the standby amplifier output 145a) with the output module 150.

Once the selector module 130 has switched away from using the first reference biasing signal 115a and the standby amplifier module 140a, the standby detect module 120 may communicate the power-up condition to the low-power biasing module 110a (e.g., via the power-down bias signal 109) and/or to the standby amplifier module 140a (e.g., via the first power-down amplifier signal 117a). The low-power biasing module 110b and/or the standby amplifier module 140a may then shut down. Again, the output voltage 155 may continue to be regulated during the transition from power-down mode to power-up mode. Further, in power-up mode, the output voltage 155 regulation may be more accurate (e.g., and may use more power) as a function of the second (e.g., higher-power) reference biasing signal 115b.

Figure 2:
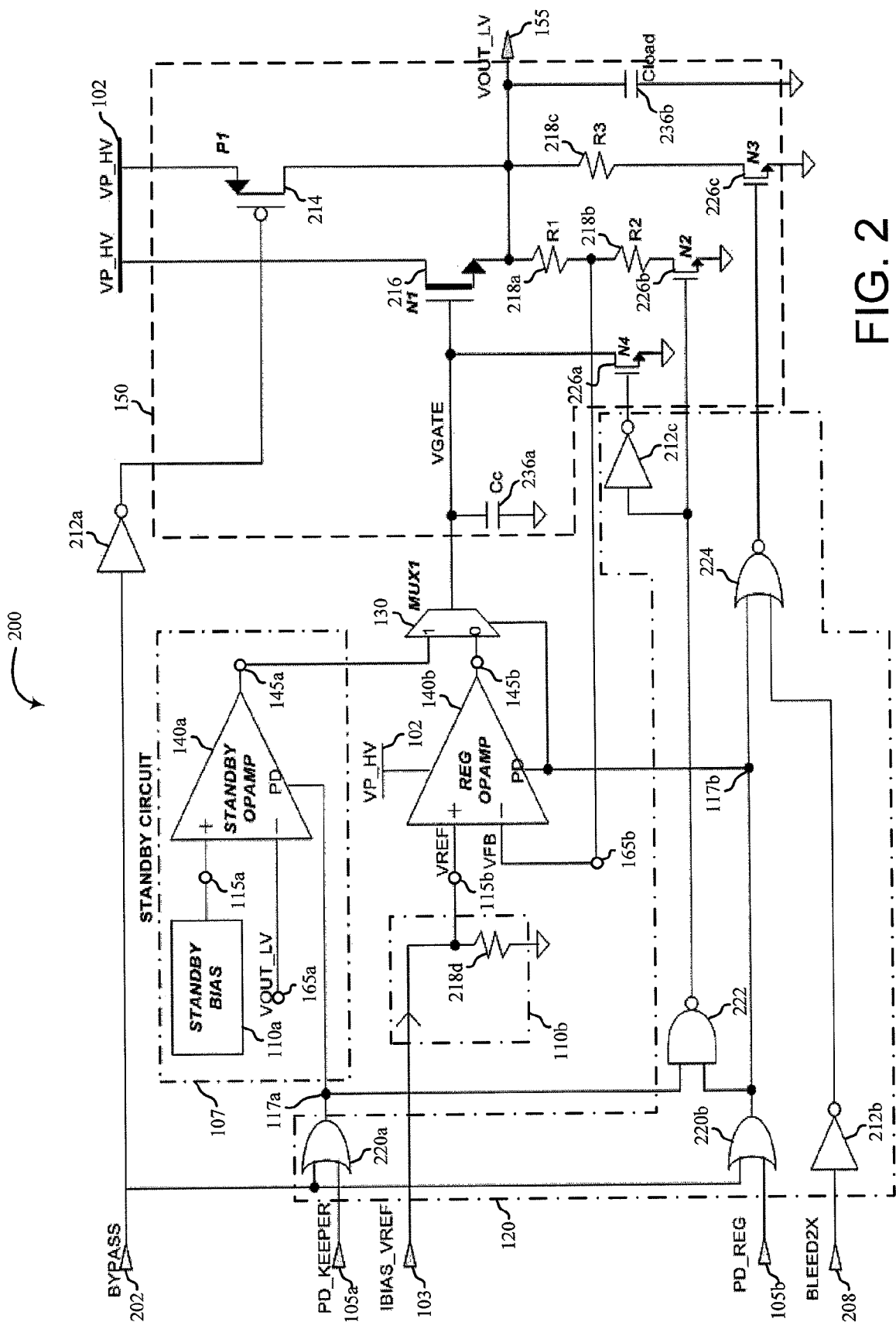
FIG. 2 shows a simplified schematic diagram for an implementation of a voltage regulator system, according to various embodiments of the invention.

It will be appreciated that many implementations of the voltage regulator systems 100 of FIGS. 1A and 1B are possible, according to various embodiments. FIG. 2 shows a simplified schematic diagram for an implementation of a voltage regulator system 200, according to various embodiments of the invention. As in FIG. 1B, the voltage regulator system 200 includes two biasing modules 110, a standby detect module 120, a selector module 130, two amplifier modules 140, and an output module 150. The voltage regulator system 200 is operable to receive a source voltage 102, and regulate the source voltage 102 to output a lower level output voltage 155.

Embodiments of the output module 150 receive the source voltage 102 and output the output voltage 155. The output module 150 includes a P-channel metal-oxide semiconductor ("PMOS") device 214; a native N-channel metal-oxide semiconductor ("NMOS") device 216; NMOS devices 226a, 226b, and 226c; feedback resistors 218a and 218b; load resistor 218c; a stabilization capacitor 236a, and a load capacitor 236b. During operation of the voltage regulator system 200, the gate of the native NMOS device 216 is controlled by the selector module (as described more below). Components of the voltage regulator system 200 (e.g., a first NMOS device 226a, a second NMOS device 226b, a first feedback resistor 218a, a second feedback resistor 218b, and/or the stabilization capacitor 236a) help bias the native NMOS device 216 to control current flow through the native NMOS device 216. This may, in turn, help control output of the output module (e.g., the resulting output voltage 155). The output voltage 155 may be further regulated by the capacitors 236.

In various embodiments, the output module 150 provides additional functionality. In one embodiment, when the voltage regulator system 200 is in power-down mode, it may be desirable to decrease the amount of load current drawn by the circuit. For example, increasing load current may increase stability and/or transient response of the circuit under different load conditions. In power-down mode, however, the load current may be decreased to adjust for changes in capacitive or transient load requirements. The load resistor 218c is connected in series with a third NMOS device 226c, forming a path from the output voltage 155 to a ground level. In power-down mode, the third NMOS device 226 may be switched OFF (e.g., via a "BLEED2X" signal 208), effectively removing the load resistor 218c from the voltage regulator system 200. In another embodiment, it is desirable to bypass the voltage regulation functionality of the voltage regulator system 200, for example, where voltage regulation is not needed. The bypass functionality is controlled by receiving a bypass signal 202, and passing the bypass signal 202 through a first inverter 212a to control the gate of the PMOS device 214. The PMOS device 214 is connected between the source voltage 102 and the output voltage 155, such that, when the PMOS device 214 is ON (e.g., conducting), the output voltage 155 is pulled up to the source voltage 102. When the voltage regulator system 200 is not in bypass mode, the PMOS device 214 is kept OFF.

Effectively, the output of the output module 150 (e.g., the output voltage 155) is regulated by one of two amplifier modules 140, as selected by the selector module 130. As shown, each of the amplifier modules 140 includes an operational amplifier configured to provide feedback regulation of the output module 150. The feedback for each amplifier module 140 is provided by a feedback signal 165, generated by components of the output module 150. In the embodiment of FIG. 2, a first feedback signal 165a (e.g., providing feedback to a standby amplifier module 140a) is tied directly to the output voltage 155. A second feedback signal 165b (e.g., providing feedback to a primary amplifier module 140b), is tied to a node between the first feedback resistor 218a and the second feedback resistor 218b. As such, the second feedback signal 165b may be calculated as the output voltage 155 minus a voltage drop across the first feedback resistor 218a.

Embodiments of the amplifier modules 140 compare the feedback signals 165 against reference biasing signals 115. The operational amplifiers in each amplifier module 140 includes a positive input terminal and a negative input terminal. Each negative input terminal receives a respective feedback signal 165 and each positive input terminal receives a respective reference biasing signal 115, such that each operational amplifier regulates in negative feedback.

As shown, the standby amplifier module 140a is configured to regulate as a function of a first feedback signal 165a and a first reference biasing signal 115a, and the primary amplifier module 140b is configured to regulate as a function of a second feedback signal 165b and the second reference biasing signal 115b. The first reference biasing signal 115a is generated by a low-power biasing module 110a. The low-power biasing module 110a is operable to generate the first reference biasing signal 115a to be good enough to provide adequate output voltage 155 regulation in power-down mode, while using a relatively low amount of power. The low-power biasing module 110a and the standby amplifier module 140a are part of a keeper system 107.

The second reference biasing signal 115b is generated by a high-power biasing module 110b. The high-power biasing module 110b includes an external biasing module (not shown) and a resistor 218d configured to operate as a current-to voltage converter. The high-power biasing module 110b receives an external biasing signal 103, and applies the external biasing signal 103 current through the resistor 218d. The voltage across the resistor 218d is then output as the second reference biasing signal 115b for use by the primary amplifier module 140b. The second reference biasing signal 115b is of sufficiently high accuracy to provide adequate output voltage 155 regulation in power-up mode. It will be appreciated that in order to provide a more accurate reference, the high-power biasing module 110b (e.g., the external biasing module) may use a significantly higher amount of power than the low-power biasing module 110a.

The amplifier outputs 145 are each connected with the selector module 130, such that the output module 150 is selectably controlled by one of the amplifier outputs 145 as a function of the selector module 130 setting. Embodiments of the selector module 130 are implemented as a multiplexer device. The standby amplifier output 145a (regulated as a function of the first reference biasing signal 115a) is connected to one selectable input of the multiplexer, and the primary amplifier output 145b (regulated as a function of the second reference biasing signal 115b) is connected to another selectable input of the multiplexer. The multiplexer may be controlled by a selection signal, such that one selectable input (e.g., the standby amplifier output 145a) is output from the multiplexer in one selection state, and the other selectable input (e.g., the primary amplifier output 145b) is output from the multiplexer in the other selection state. For example, in power-down mode, the standby amplifier output 145a is selected and routed to the output module 150; and, in power-up mode, the primary amplifier output 145b is selected and routed to the output module 150.

Embodiments of the selector module 130 are controlled by a standby detect module 120. The standby detect module 120 is configured to receive one or more standby detect signals 105 (e.g., a "PD_KEEPER" signal and a "PD_REG" signal) that direct the voltage regulator system 200 to enter power-down or power-up mode. As discussed above, in regular power-up mode, the output voltage 155 is regulated by the primary amplifier output 145b configured to use the second reference biasing signal 115b from the high-power biasing module 110b (e.g., the selector module 130 is configured to pass the primary amplifier output 145b to the output module 150). When the standby detect signals 105 indicate that the voltage regulator system 200 should enter power-down (e.g., standby) mode, the standby detect module 120 may direct the low-power biasing module 110a to start up.

The low-power biasing module 110a may begin to generate the first reference biasing signal 115a. When the first reference biasing signal 115a is ready for use by the standby amplifier module 140a, the low-power biasing module 110a may trigger (e.g., via the standby detect module 120) the standby amplifier module 140a to start up (via a first power-down amplifier signal 117a). The standby amplifier module 140a may then begin regulating as a function of the first reference biasing signal 115a. The standby detect module 120 may then direct the selector module 130 to switch, so as to connect the standby amplifier output 145a (rather than the primary amplifier output 145b) with the output module 150.

In certain embodiments, the standby detect module 120 may further signal the high-power biasing module 110b and/or the primary amplifier module 140b to shut down (e.g., via a second power-down amplifier signal 117b). As shown in FIG. 2, the second power-down amplifier signal 117b may be used as the selector signal for switching the selector module 130. In this way, the output voltage 155 may continue to be regulated during the transition from power-up mode to power-down mode. Further, in power-down mode, the output voltage 155 regulation may continue as a function of the first (e.g., low-power) reference biasing signal 115a and the standby amplifier output 145a, while allowing higher power components and systems to be shut down.

At some later time, the system into which the voltage regulator system 200 is integrated may be powered back up. The standby detect signals 105 may indicate that the voltage regulator system 200 should enter power-up (e.g., regular) mode. The standby detect module 120 may further receive an indication that the primary amplifier output 145b is ready to be used for controlling the output module 150. The standby detect module 120 may direct the selector module 130 to switch, so as to connect the primary amplifier output 145b (rather than the standby amplifier output 145a) with the output module 150.

Once the selector module 130 has switched away from using the first reference biasing signal 115a and the standby amplifier output 145a, the standby detect module 120 may communicate the power-up condition to the low-power biasing module 110a and/or to the standby amplifier module 140a (e.g., via the first power-down amplifier signal 117a). The low-power biasing module 110b and/or the standby amplifier module 140a may then shut down. Again, the output voltage 155 may continue to be regulated during the transition from power-down mode to power-up mode. Further, in power-up mode, the output voltage 155 regulation may be more accurate (e.g., and may use more power) as a function of the second (e.g., higher-power) reference biasing signal 115b.

It will be appreciated that various signals are controlled and/or timed according to the specific design topologies and specifications of the voltage regulator system 200 and external components with which it is integrated. For example, the standby detect module 120 is shown having a number of logic units, including OR gates 220, an NAND gate 222, a NOR gate 224, and inverter gates 212. These components represent only one enabled embodiment and should not be construed as limiting the scope of the invention. For example, in U.S. patent application Ser. No. 12/421,682, filed Apr. 10, 2009, entitled "CALIBRATED TRANSFER RATE", which is hereby incorporated by reference, FIG. 3 describes a block diagram of an illustrative architecture, and FIG. 5 describes a flow diagram of an illustrative method, both of which may be used to generate and/or exploit signals and timing relating to voltage regulator embodiments described herein.

Figure 3A:
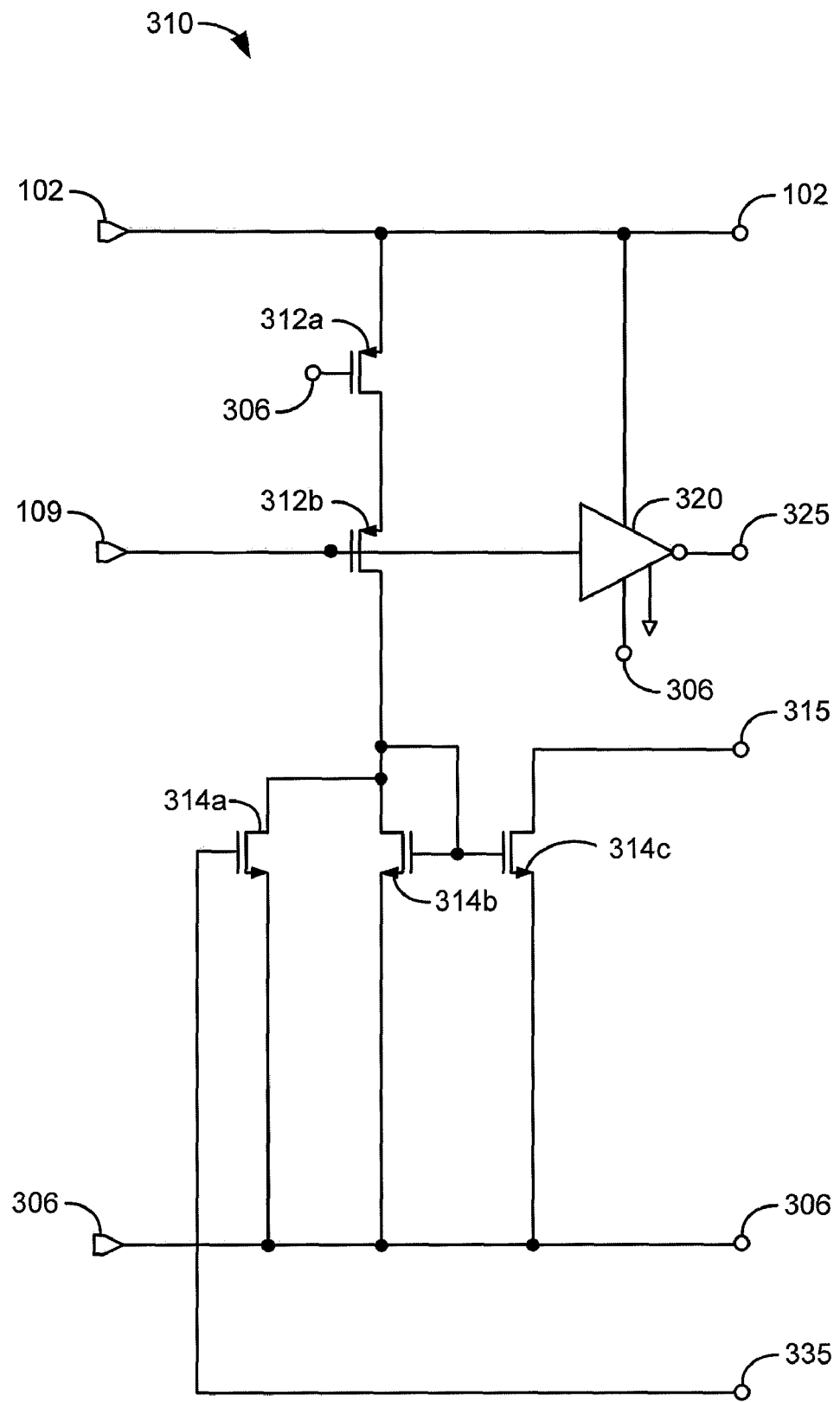
FIG. 3A shows a schematic diagram of a start-up circuit for a low-power biasing module, according to various embodiments of the invention.
Figure 3B:
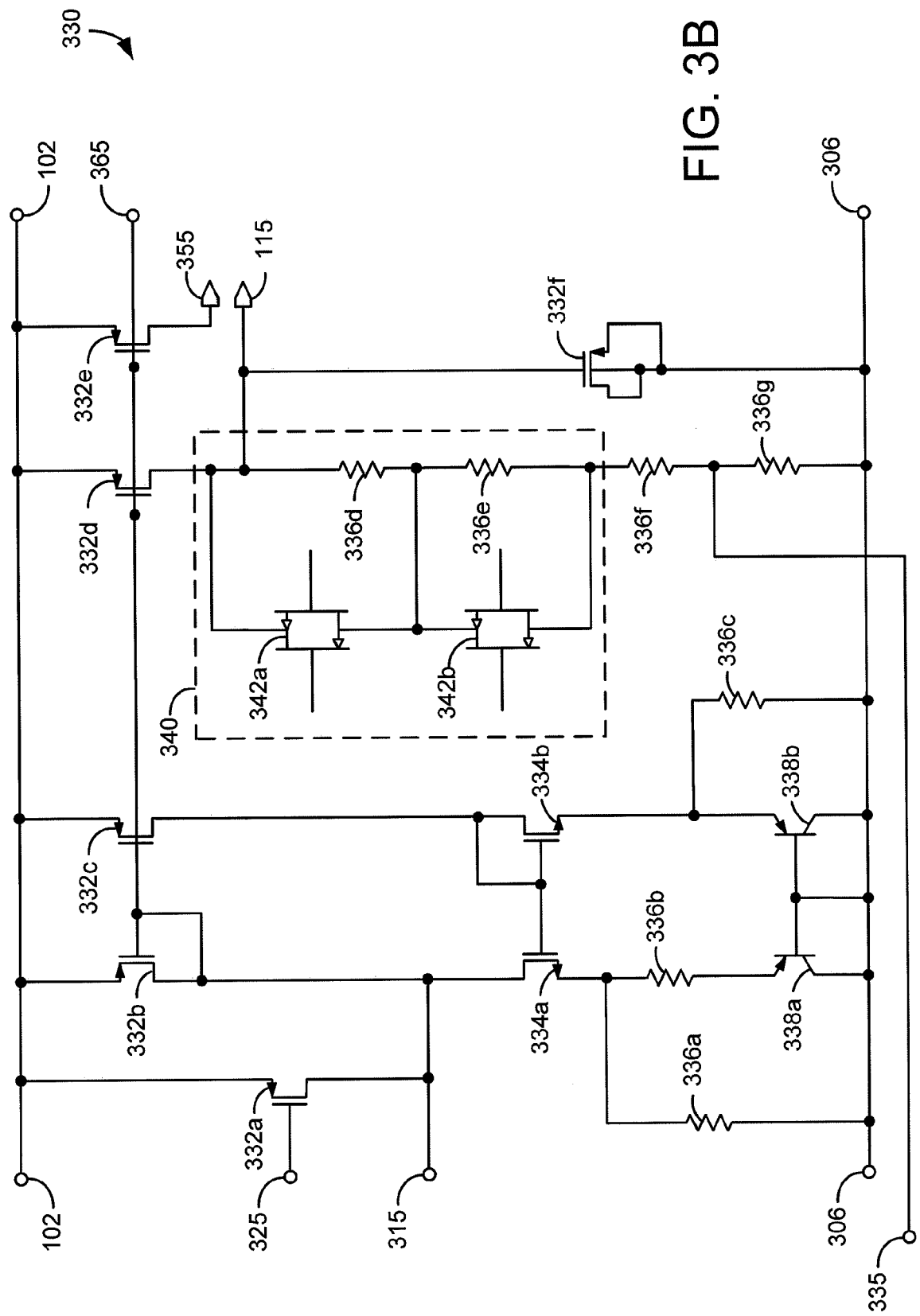
FIG. 3B shows a schematic diagram of a bias generator circuit for a low-power biasing module, according to various embodiments of the invention.
Figure 3C:
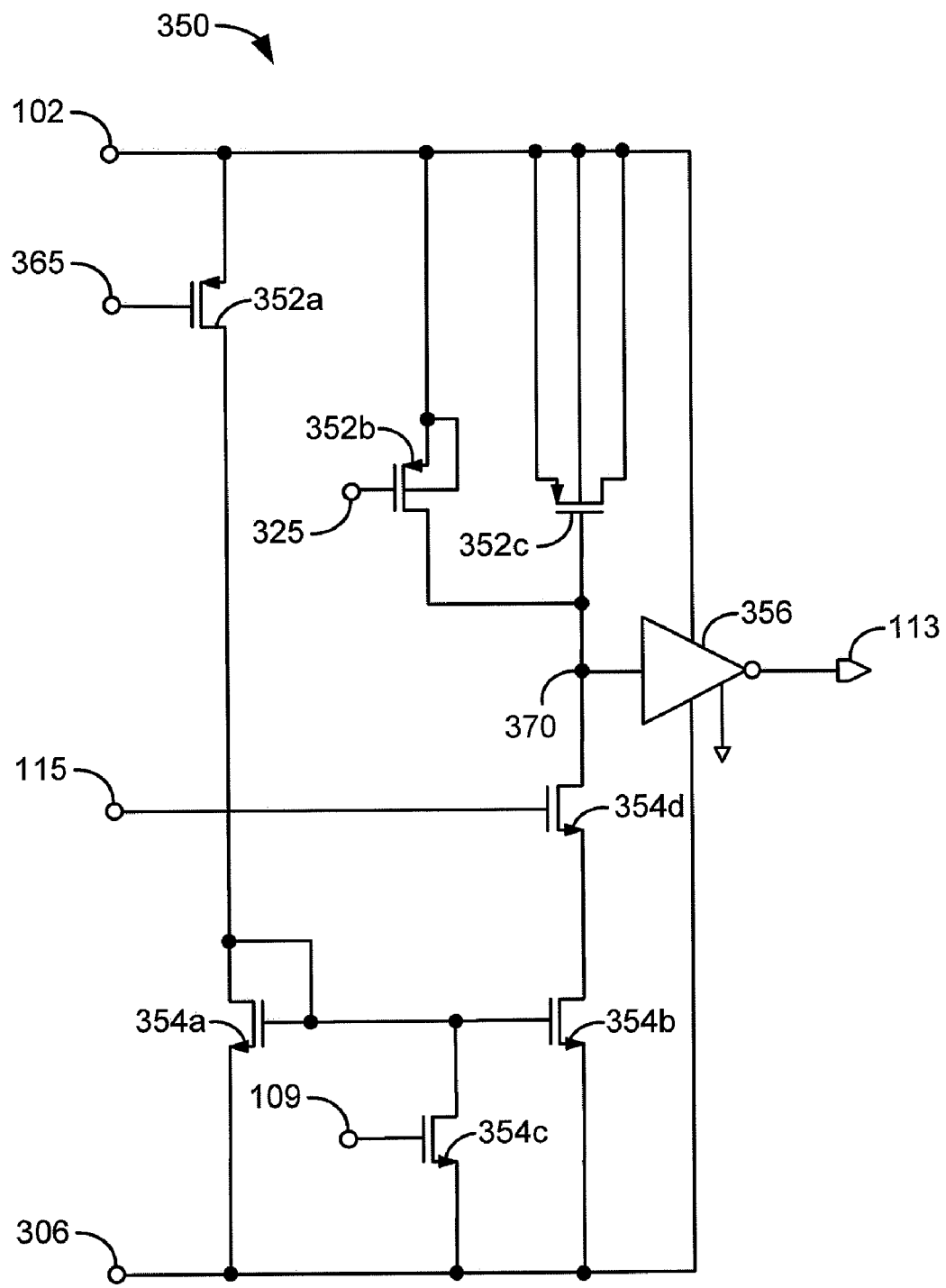
FIG. 3C shows a schematic diagram of a reference ready signal generator circuit for a low-power biasing module, according to various embodiments of the invention.
Figure 4:
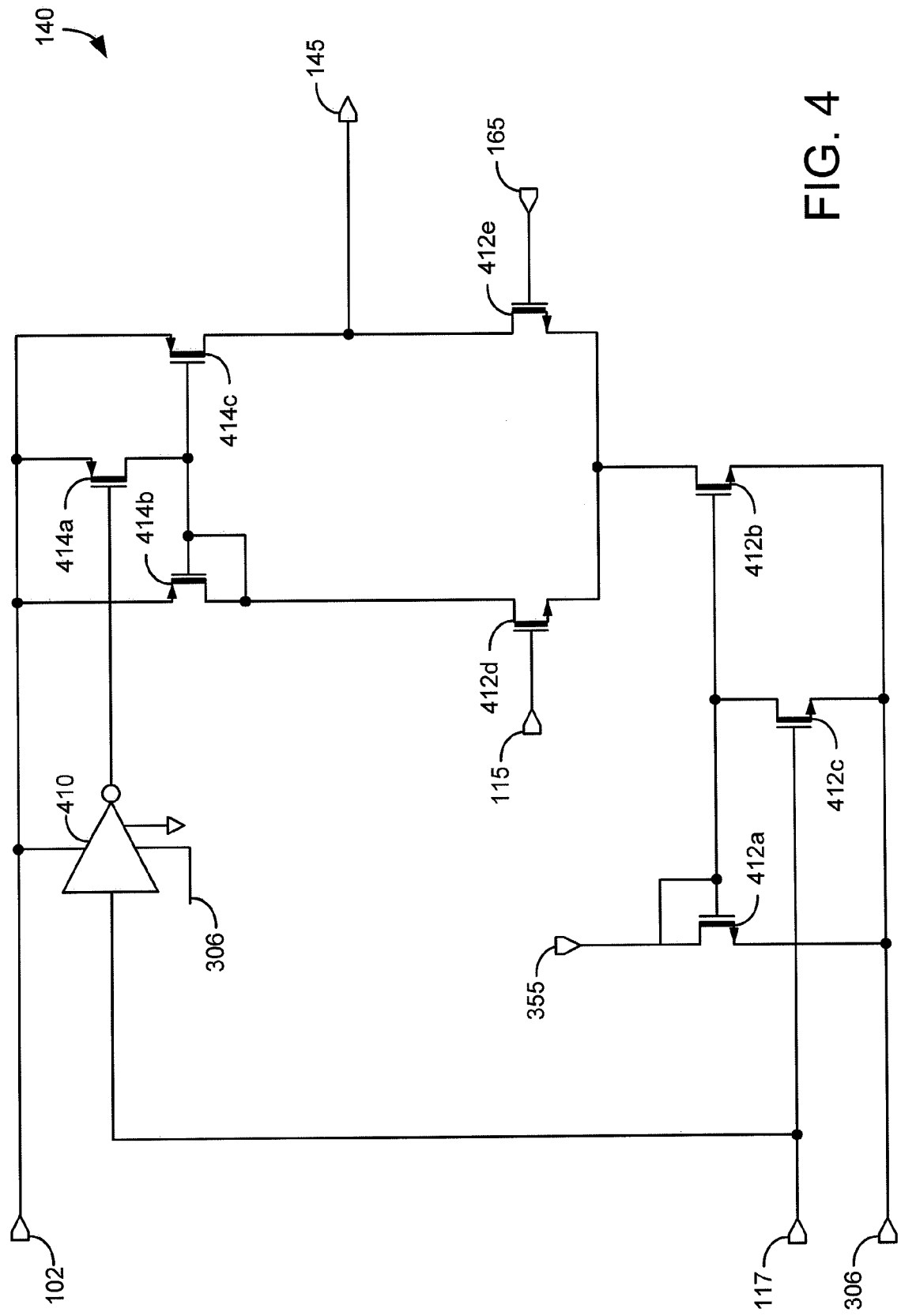
FIG. 4 shows a schematic diagram of an amplifier module for use with a low-power biasing module, according to various embodiments of the invention.

It will be further appreciated that the functionality of the voltage regulator systems of FIGS. 1A, 1B, and 2 may be implemented in many different ways without departing from the scope of the embodiments. For example, FIGS. 3A-3C show an embodiment of components of a low-power biasing module, like the low-power biasing module 110a of FIGS. 1B and 2; and FIG. 4 shows an embodiment of a standby amplifier module 140a, like the standby amplifier module 140a of FIGS. 1B and 2. Signal reference numbering has been maintained throughout the drawings to add clarity to the descriptions. However, it will be appreciated that the signals may be modified using methods known in the art without departing from the scope of the embodiments.

FIG. 3A shows a schematic diagram of a start-up circuit 310 for a low-power biasing module, according to various embodiments of the invention. The start-up circuit 310 includes two PMOS devices 312, three NMOS devices 314, and an inverter 320. Components of the start-up circuit 310 are tied between a source voltage 102 and a ground level 306, and are controlled by a power-down bias signal 109 and a start-up feedback signal 335.

As discussed above, the low-power biasing module is configured to be used in a system having a power-up (e.g., regular) mode and a power-down (e.g., standby) mode. In power-down mode, it is desirable to start up the low-power biasing module, and the power-down bias signal 109 goes LOW. The power-down bias signal 109 drives the gate of a second PMOS device 312b, and a LOW gate input causes the second PMOS device 312b to turn on. The second PMOS device 312b is in series with a first PMOS device 312a that has its gate connected to ground 306, such that it is always ON, and its source connected to the source voltage 102 (e.g., the first PMOS device 312a may effectively act as a weak pull-up resistance). Turning the second PMOS device 312b ON starts current flowing through the PMOS devices 312 from the source voltage 102. This current is mirrored by a current mirror configuration of a second NMOS device 314b and a third NMOS device 314c, both having sources connected to ground. The drain of the third NMOS device is connected with a start-up output node 315. As such, a LOW power-down bias signal 109 (e.g., turning ON the second PMOS device 312b) may cause the third NMOS device 314c to begin sinking current through the start-up output node 315.

As described with reference to FIG. 3B below, sinking current through the start-up output node 315 may cause a bias generator portion of the low-power biasing module to begin generating a reference level (e.g., the first reference biasing signal 115a). The start-up feedback signal 335 may be proportional (e.g., or otherwise related) to the reference level, such that, as the reference level increases, the start-up feedback signal 335 may increase. When the start-up feedback signal 335 reaches a certain level (e.g., the threshold voltage of a first NMOS device 314a), the first NMOS device 314a may turn ON. This may effectively turn off the start-up circuit 310.

Similarly, in power-up mode, it may be desirable to turn off the start-up circuit 310 because the low-power biasing module may not be in use. In power-up mode, the power-down bias signal 109 becomes HIGH, which turns OFF the second PMOS device 312b, halting current flow through the PMOS devices 312 from the source voltage 102. This may effectively turn off the start-up circuit 310. The start-up circuit 310 also includes a power-down bias invert signal 325, which is generated by the inverter 320 to be substantially an inverted version of the power-down bias signal 109. As such, in power-down mode, the power-down bias invert signal 325 may be HIGH, and in power-up mode, the power-down bias invert signal 325 may be LOW.

The power-down bias invert signal 325, the start-up output terminal 315, and the start-up feedback signal 335, may be in communication with a bias generator portion of the low-power biasing module. FIG. 3B shows a schematic diagram of a bias generator circuit 330 for a low-power biasing module, according to various embodiments of the invention. The bias generator circuit 330 is configured to be deactivated using the power-down bias invert signal 325 generated by the start-up circuit 310 in FIG. 3A. The power-down bias invert signal 325 drives the gate of a first PMOS device 332a, connected between the source voltage 102 and the start-up output terminal 315. In power-up mode, the power-down bias invert signal 325 is LOW, which may turn ON the first PMOS device. This may pull the start-up output terminal 315 up to the source voltage 102, effectively disabling the bias generator circuit 330 (e.g., by turning OFF PMOS devices 332). In power-down mode (e.g., when it is desirable to turn on the low-power biasing module), the power-down bias invert signal 325 is HIGH, turning OFF the first PMOS device 332a, and allowing the start-up output node 315 to sink current, as described above.

When the start-up output node 315 begins sinking current (e.g., under control of the third NMOS device 314c in FIG. 3A, current may begin to flow through a second PMOS device 332b. The current may be mirrored by a third PMOS device 332c, which may pull up the gate of a second NMOS device 334b. Current flowing through the second NMOS device 334b may then be mirrored by a first NMOS device 334a. The sources of the first NMOS device 334a and the second NMOS device 334b are configured to drive a set of resistors (336a, 336b, and 336c) and a pair of bipolar devices (338a and 338b). This topology may effectively create a bandgap reference current with a substantially zero temperature coefficient.

The bandgap reference may be used to set a gate biasing level 365 (e.g., via the second PMOS device 332b) for controlling the gates of a set of PMOS devices, including the third PMOS device 332c, a fourth PMOS device 332d, and a fifth PMOS device 332e. As such, the bandgap reference may cause a stable current to be driven through the fourth PMOS device 332d. The current driven through the fourth PMOS device 332d is passed through a set of resistors (336d, 336e, 336f, and 336g), connected in series between the drain of the fourth PMOS device 332d and ground 306. The series resistors in this topology may effectively generate a multiple of the bandgap reference voltage, which may be output as a reference biasing signal 115 (e.g., the first reference biasing signal 115a in FIGS. 1A, 1B, and 2). The bias generator circuit 330 may include a sixth NMOS device 332f, configured to provide a capacitive load between the reference biasing signal 115 and ground (e.g., for added stabilization). Additionally, the bandgap reference may drive a stable current through the fifth PMOS device 332e, as described above. A node at the drain of the fifth PMOS device 332e may provide this current as op-amp bias current 355 for use in biasing an operational amplifier.

In some embodiments, a resistor select unit 340 is provided. The resistor select unit 340 may include a number of selectable resistors 336 and selection blocks 342. In the embodiment shown, resistor 336d and resistor 336e (e.g., both part of the set of resistors 336 connected in series between the drain of the fourth PMOS device 332d and ground 306) are configured to be selectable by a first selection block 342a and a second selection block 342b of the resistor select unit 340, respectively. Selecting or deselecting the resistors 336 using the resistor select unit 340 may adjust the reference biasing signal 115, for example, by adjusting the bandgap multiplier.

As shown, the start-up feedback signal 335 for the start-up circuit 310 in FIG. 3A may be connected to (e.g., supplied by) a node between resistor 336f and resistor 336g. It will be appreciated that, because the current through resistor 336g is being driven (e.g., by the fourth PMOS device 332d), the voltage drop across resistor 336g may be substantially unaffected by the resistor select unit 340. Further, the resistance of resistor 336g may be designed to provide a desired voltage level on the start-up feedback signal 335, so that the start-up circuit 310 of FIG. 3A will turn off when the reference biasing signal 115 has reached an appropriate level.

According to some embodiments, as described above, when the system switches to power-down mode, the start-up circuit 310 of FIG. 3A is directed to turn on. This may cause the bias generator circuit 330 of FIG. 3B to begin generating a reference level for an amplifier (e.g., the first reference biasing signal 115a for use by the standby amplifier module 140a of FIG. 1B or 2). However, it may take some amount of time before the reference level has reached, and has stabilized at, an appropriate level. Further, it may be desirable to wait until the reference level is stable before using the reference level for regulation. As such, it may be desirable, in some embodiments of low-power biasing modules, to generate a reference ready signal 113 to indicate that a stable reference is available. In some embodiments, as described above with reference to FIGS. 1A, 1B, and 2, the reference ready signal 113 is communicated to a standby detect module 120. Upon receipt of the reference ready signal 113, the standby detect module 120 may signal a selector module 130 and/or an amplifier module 140 to turn on and begin regulating as a function of the reference ready signal 113.

FIG. 3C shows a schematic diagram of a reference ready signal generator circuit 350 for a low-power biasing module, according to various embodiments of the invention. The reference ready signal generator circuit 350 receives the reference biasing signal 115 and the gate biasing level 365 from the bias generator circuit 330 of FIG. 3B. The reference ready signal generator circuit 350 is configured to be deactivated using the power-down bias signal 109 received by, and the power-down bias invert signal 325 generated by, the start-up circuit 310 in FIG. 3A. The power-down bias signal 109 drives the gate of a third NMOS device 354c having its source connected to ground 306, and the power-down bias invert signal 325 drives the gate of a second PMOS device 352b, connected between a source voltage 102 and node 370. In power-up mode, the power-down bias signal 109 is HIGH and the power-down bias invert signal 325 is LOW, which may turn ON both the third NMOS device 354c and the second PMOS device 352b. This may pull node 370 up to the source voltage 102 and pull the gates of the first NMOS device 354a and the second NMOS device 354b (configured as a current mirror, as described below) to ground, effectively disabling the reference ready signal generator circuit 350. In power-down mode (e.g., when it is desirable to turn on the low-power biasing module), the power-down bias signal 109 is LOW and the power-down bias invert signal 325 is HIGH, turning OFF both the third NMOS device 354c and the second PMOS device 352b, and allowing the current mirror and node 370 to operate according to other components of the reference ready signal generator circuit 350, as described below.

The gate biasing level 365 drives the gate of a first PMOS device 352a, driving a current from the source voltage 102 through the first PMOS device 352a and through a first NMOS device 354a in series with the first PMOS device 352a. The current is mirrored into a second NMOS device 354b in series with a fourth NMOS device 354d. The gate of the fourth NMOS device 354d is controlled by the reference biasing signal 115, and the drain of the fourth NMOS device 354d is connected to node 370. Node 370 is also connected to the gate of a third PMOS device 352c, configured as a capacitive element. After the reference biasing signal 115 reaches a certain level, and after a delay set in part by the capacitive effects of the third PMOS device 352c, the fourth NMOS device 354d will turn ON. For example, after the fourth NMOS device 354d turns ON, node 370 begins to discharge with a delay time determined in part by the capacitive effects of the third PMOS device 352c and the discharge current provided by the second NMOS device 354b. When node 370 discharges to a level (e.g., determined by the ratio of PMOS and NMOS devices in an inverter 356) an output of the inverter 356 may transition from LOW to HIGH, thereby providing the reference ready signal 113.

It will now be appreciated that the bias generator circuit 330 of FIG. 3B may provide an amplifier module 140 with both an appropriate biasing current (via the op-amp bias current 355) and with an appropriate reference input (via the reference biasing signal 115). Further, the reference ready signal generator circuit 350 of FIG. 3C may provide the reference ready signal 113 for indicating that the reference biasing signal 115 is ready for use by the amplifier module 140. FIG. 4 shows a schematic diagram of an amplifier module 140 for use with a low-power biasing module, according to various embodiments of the invention.

Embodiments of the amplifier module 140 are configured to be deactivated using a power-down amplifier signal 117 (e.g., the shown in FIG. 2). The power-down amplifier signal 117 drives the gate of a third NMOS device 412c, and an inverted version of the power-down amplifier signal 117 (e.g., generated by an inverter 410) drives the gate of a first PMOS device 414a. In power-up mode, the power-down amplifier signal 117 may be HIGH, such that the first PMOS device 414a and the third NMOS device 412c are both ON. Driving the devices in this way may effectively disable the amplifier module 140. In power-down mode (e.g., when it may be desirable to enable the amplifier module 140), the power-down amplifier signal 117 may be LOW, such that the first PMOS device 414a and the third NMOS device 412c are both OFF. Driving the devices in this way may effectively allow the amplifier module 140 to operate as a regulator device.

In normal operation, the op-amp bias current 355 is passed through a first NMOS device 412a and mirrored to a second NMOS device 412b. The sources of both the first NMOS device 412a and the second NMOS device 412b are connected to ground 306, thereby acting effectively as a bias current source for maintaining a substantially constant bias current for the amplifier module 140. A current steering topology is connected between the source voltage 102 and the second NMOS device 412b (e.g., the bias current source). One side of the current steering topology includes a second PMOS device 414b in series with a fourth NMOS device 412d. The gate of the fourth NMOS device 412d is driven by the reference biasing signal 115. The other side of the current steering topology includes a third PMOS device 414c in series with a fifth NMOS device 412e. The fourth NMOS device 412d and the fifth NMOS device 412e may form a differential pair. The gate of the fifth NMOS device 412e is driven by a feedback signal 165. In some embodiments, the feedback signal 165 is tied to an output voltage of a voltage regulator using the amplifier module for regulation (e.g., as shown in FIG. 2). An output node of the amplifier module may be tied to a node between the third PMOS device 414*c* and the fifth NMOS device 412*e* (the feedback side of the current steering topology). The level at the output node of the amplifier module 140 may be used as the amplifier output signal 145 of FIG. 2.

Figure 5:
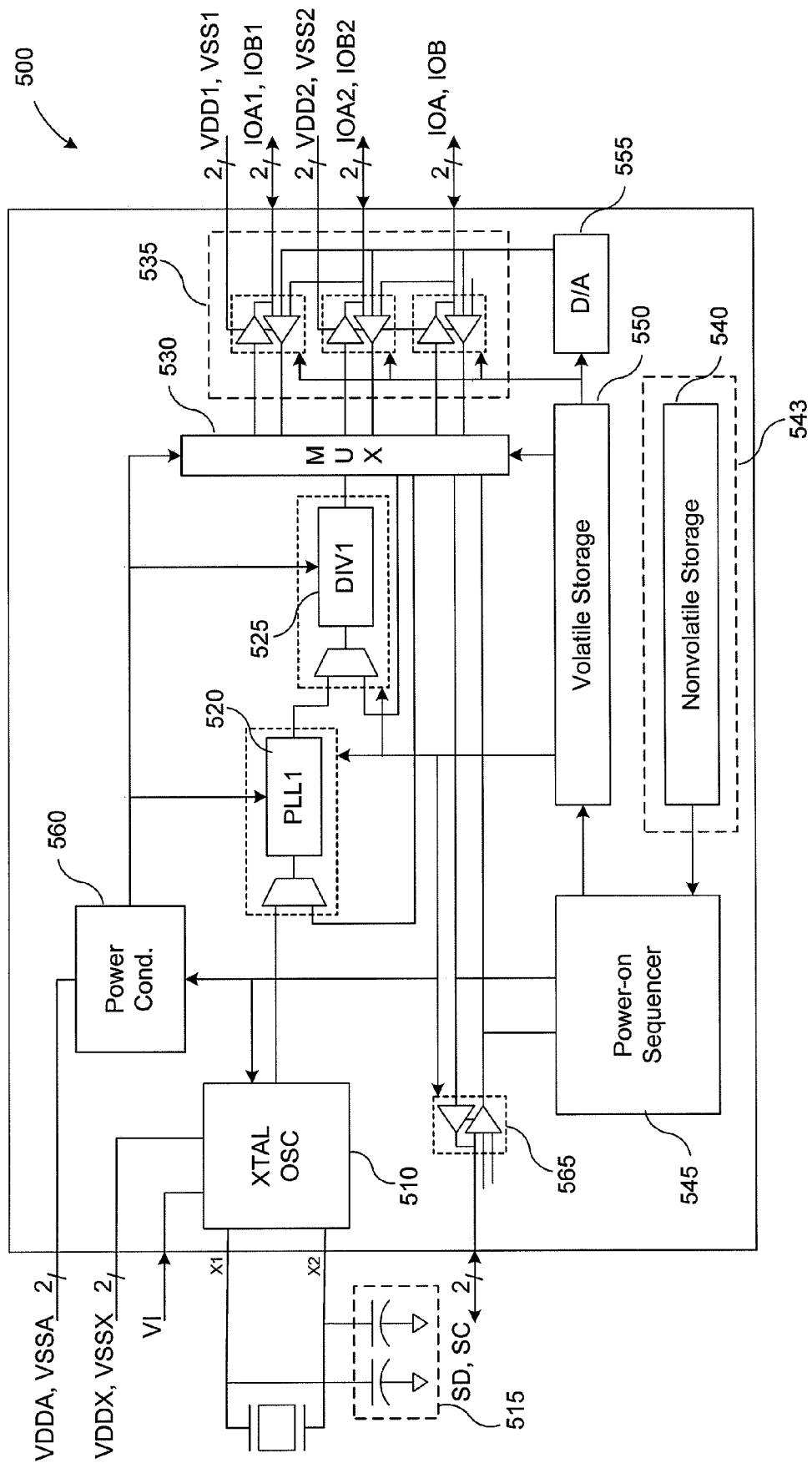
FIG. 5 illustrates a simplified block diagram of a clock circuit arrangement, for use with various embodiments of the invention.

It will be appreciated that modifications may be made to the implementations of the amplifier module 140 embodied in FIG. 4, without departing from the scope of the invention. Further, it will be appreciated that embodiments of the components and systems of FIGS. 1-4 may be incorporated into a larger system or circuit arrangement. FIG. 5 illustrates a simplified block diagram of a clock circuit arrangement 500, for use with various embodiments of the invention.

An external crystal is connected to a voltage controlled crystal oscillator ("VCXO") 510 in an exemplary embodiment. A pair of capacitors 515 connect crystal oscillator inputs X1, X2 to ground. In some embodiments, the capacitors 515 are implemented as voltage-controlled loads, like varactors. VCXO power ("VDDX"), VCXO ground ("VSSX"), and VCXO input voltage ("VI") are external inputs to the VCXO 510. In some embodiments, the VCXO 510 is implemented according to an embodiment of the present invention. For example, embodiments of oscillator control system 100 of FIG. 1 and/or the oscillator control circuit 200 of FIG. 2 may be included in implementations of the VCXO 510 to provide functionality of the crystal oscillator.

An output of the VCXO 510 is connected with an input multiplexer ("mux") of a phase lock loop (PLL1) 520, providing a reference signal for the PLL 520. In some embodiments, additional PLLs 520 may be used to allow for additional I/Os and further programmability. An output of the PLL 520 is connected with the input multiplexer of a PLL divider ("DIV1") 525. An output of the PLL divider 525 is fed to a MUX 530. A first set of outputs of the MUX 530 are connected with programmable input/output buffers 535. Additional outputs from the MUX 530 may be connected with the input mux of PLL1 520 and the input mux of the PLL divider 525.

The clock generator circuit 500, including a nonvolatile storage array 540, may be fabricated, for example, in a single monolithic semiconductor substrate or alternately, the nonvolatile storage array 540 may reside on a second semiconductor substrate 543. An output of the nonvolatile storage array 540 may be in communication with a power-on sequencer 545. The Power-on Sequencer 545 may include a voltage regulator, like the voltage regulator systems of FIGS. 1A, 1B or 2, in accordance with the present exemplary embodiment. For example, in accordance with the voltage regulator system 100*b* of FIG. 1B, the clock generator circuit 500 may operate in either a power-up mode or a power-down (standby) mode. In the power-down mode, the standby amplifier module 140*a* operates in conjunction with the low-power biasing module 110*a* (not shown) to produce regulated low-voltage power to digital circuits within the clock generator circuit 500. The power-on sequencer 545 may control timing and/or signals needed for proper operation of the voltage regulator system 100*b* in both the power-up and power-down modes. The power-on sequencer 545 may communicate with a volatile storage array 550.

The volatile storage array 550 is in communication with a digital-to-analog ("D/A") block 555, a power conditioner block 560, a serial input/output ("I/O") block 565, the programmable input/output buffers 535, the mux 530, the PLL 520, the PLL divider 525, and the VCXO 510. The serial I/O block 565 communicates with serial data and serial clock inputs SD, SC, the power-on sequencer 545, and the MUX 530. The power conditioner block 560 is connected with PLL power inputs VDDA, VSSA.

Figure 6A:
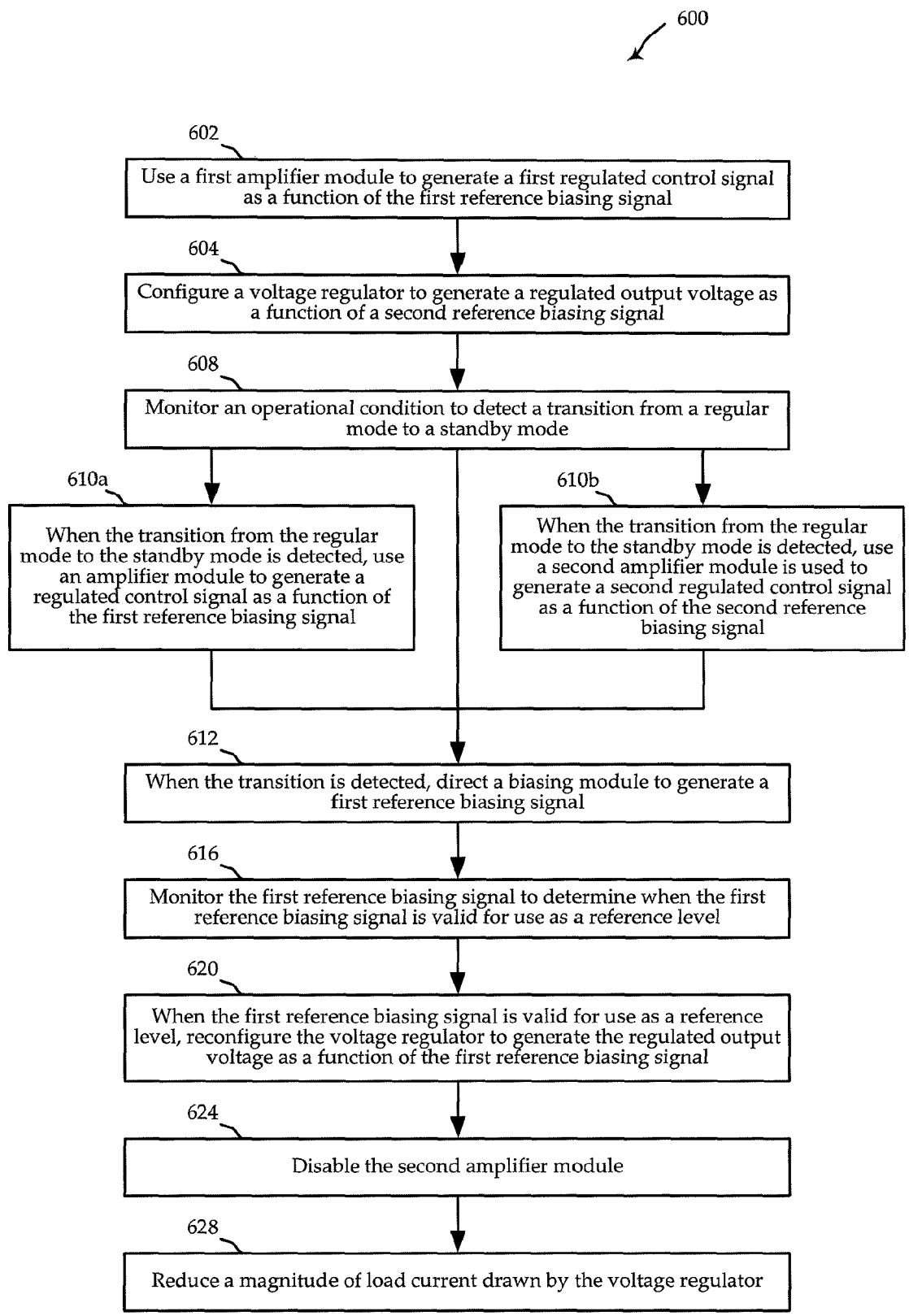
FIG. 6A shows a flow diagram of a method for maintaining voltage regulation during a transition from a power-up (regular) mode to a power-down (standby) mode of operation, according to various embodiments of the invention.

It will be appreciated that the circuits described above provide only exemplary systems for providing functionality according to embodiments of the invention. For example, those and other embodiments may perform the methods of FIGS. 6A and 6B. FIG. 6A shows a flow diagram of a method 600 for maintaining voltage regulation during a transition from a power-up (regular) mode to a power-down (standby) mode of operation, according to various embodiments of the invention.

Embodiments of the method 600 begin at block 604 by configuring a voltage regulator to generate a regulated output voltage as a function of a second reference biasing signal. In some embodiments, the voltage regulator is the voltage regulator system 100*a* of FIG. 1A; while in other embodiments, the voltage regulator is the voltage regulator system 100*b* of FIG. 1B. At block 608, an operational condition may be monitored to detect a transition from a regular mode to a standby mode. When the transition is detected, a biasing module may be directed at block 612 to generate a first reference biasing signal.

In some embodiments, the first reference biasing signal is monitored at block 616 to determine when the first reference biasing signal is valid for use as a reference level. Embodiments of the first reference biasing signal are generated using less power than used to generate the second reference biasing signal. For example, the first reference biasing signal may be generated with a low-power biasing module, while the second reference biasing signal may be generated by a higher power external biasing module. Further, the second reference biasing module may provide a higher accuracy reference than the reference provided by the first reference biasing signal.

When the monitoring step in block 616 determines that the first reference biasing signal is valid for use as a reference level, the voltage regulator may be reconfigured at block 620 to generate the regulated output voltage as a function of the first reference biasing signal. For example, the regulated output voltage may be generated by a module or set of modules in communication with the output of a multiplexer. The output of the multiplexer may be selected as either the first reference biasing signal or the second reference biasing signal.

In some embodiments, when the transition from the regular mode to the standby mode is detected in block 608, an amplifier module is used to generate a regulated control signal at block 610*a* as a function of the first reference biasing signal. In these embodiments, the voltage regulator is reconfigured in block 620 to generate the regulated output voltage as a function of the regulated control signal (e.g., and thereby as a function of the first reference biasing signal). In other embodiments, a first amplifier module is used to generate a first regulated control signal at block 602 as a function of the first reference biasing signal, and a second amplifier module is used to generate a second regulated control signal in block 610*b* as a function of the second reference biasing signal. In these embodiments, the voltage regulator is configured in block 604 to generate the regulated output voltage as a function of the second regulated control signal (e.g., and thereby as a function of the second reference biasing signal), and the voltage regulator is reconfigured in block 620 to generate the regulated output voltage as a function of the first regulated control signal (e.g., and thereby as a function of the first reference biasing signal).

After reconfiguring the voltage regulator in block 620 to generate the regulated output voltage as a function of the first reference biasing signal, embodiments of the method 600 may perform additional steps. In one embodiment, the second amplifier module may be disabled (e.g., shut down) at block 624, for example, to increase regulator efficiency. In another embodiment, at block 628, a magnitude of load current drawn by the voltage regulator may be reduced. For example, the voltage regulator may have multiple load current paths, and one path may be disconnected.

Figure 6B:
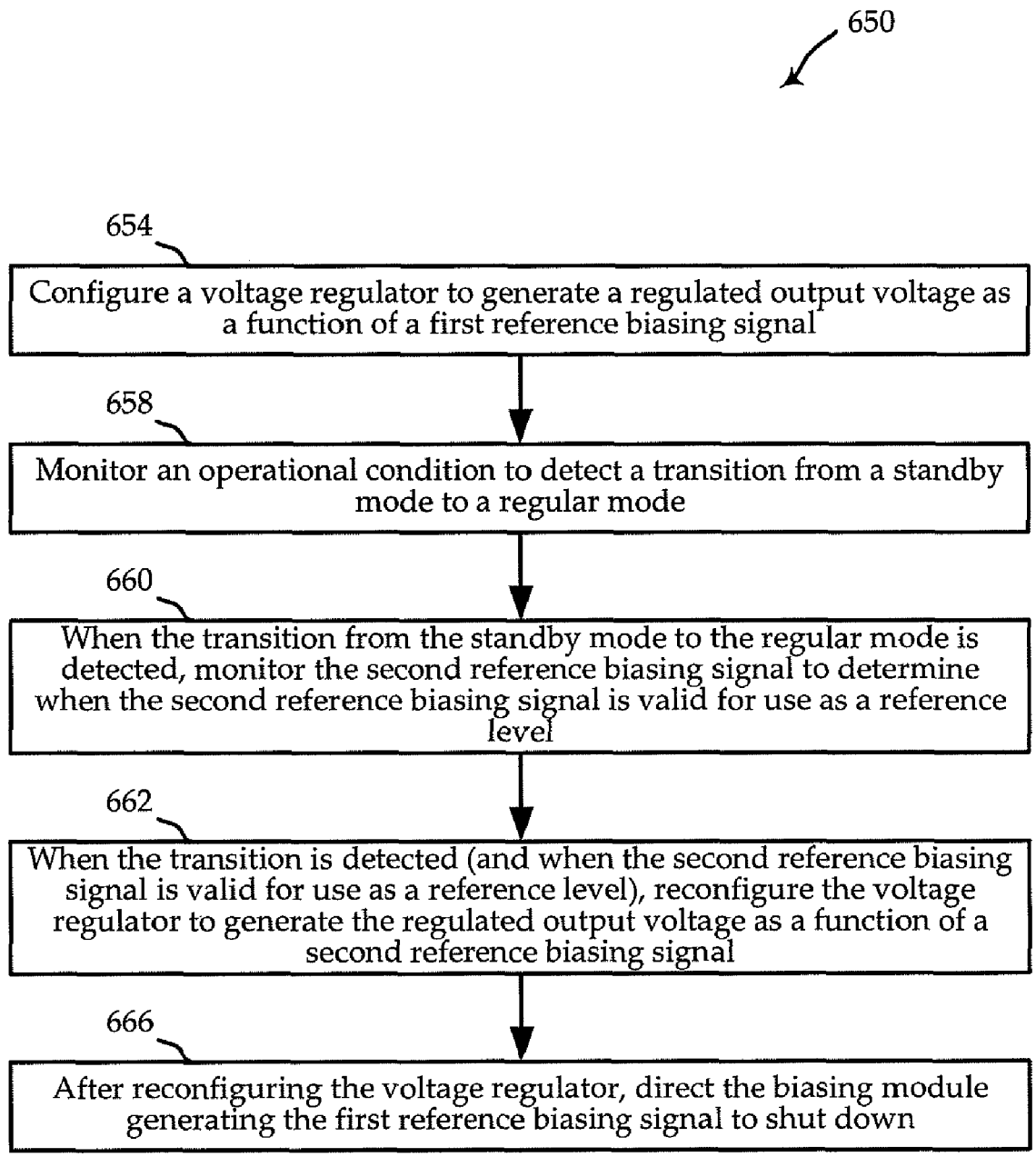
FIG. 6B shows a flow diagram of a method for maintaining voltage regulation during a transition from a power-down mode to a power-up mode of operation, according to various embodiments of the invention.

FIG. 6B shows a flow diagram of a method 650 for maintaining voltage regulation during a transition from a power-down mode to a power-up mode of operation, according to various embodiments of the invention. In some embodiments, the method 650 of FIG. 6B follows the steps of the method 600 of FIG. 6A. As such, embodiments of the method 650 begin at block 654 by configuring a voltage regulator to generate a regulated output voltage as a function of a first reference biasing signal.

At block 658, the method 650 may continue by monitoring an operational condition to detect a transition from the standby mode to the regular mode. When the transition is detected, the voltage regulator may be reconfigured at block 662 to generate the regulated output voltage as a function of a second reference biasing signal. As discussed with reference to FIG. 6A, the second reference biasing signal may be generated with higher power (e.g., and higher accuracy) than the first reference biasing signal. At block 666, after reconfiguring the voltage regulator to generate the regulated output voltage as a function of the second reference biasing signal, the biasing module generating the first reference biasing signal may be directed to shut down (e.g., the stop generating the first reference biasing signal). In some embodiments, when the transition from the standby mode to the regular mode is detected in block 658, the second reference biasing signal is monitored at block 660 to determine when the second reference biasing signal is valid for use as a reference level. In these embodiments, the voltage regulator may be reconfigured in block 662 to generate the regulated output voltage as a function of the second reference biasing signal only when the second reference biasing signal is valid for use as a reference level.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

It should also be appreciated that the following systems and methods may individually or collectively be components of a larger system, wherein other procedures may take precedence over or otherwise modify their application. Also, a number of steps may be required before, after, or concurrently with the following embodiments. Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Accordingly, the above description should not be taken as limiting the scope of the invention, which is defined by the appended claims.

What is claimed is:

1. A voltage regulator system, comprising:
   a biasing module, operable to generate a first reference biasing signal using a first magnitude of power;
   a first amplifier module, operable to generate a first regulated control signal as a function of the first reference biasing signal;
   a second amplifier module, operable to generate a second regulated control signal as a function of a second reference biasing signal, the second reference biasing signal being generated using a second magnitude of power that is higher than the first magnitude of power;
   a standby detect module, operable to detect an operational condition being selected from a group consisting of a regular mode and a standby mode, and to output a selector input signal as a function of the operational condition;
   a selector module, operable to receive the first regulated control signal and the second regulated control signal, and to output a selector output signal as a function of the selector input signal, such that:
      when the operational condition is the standby mode, the selector output signal is a function of the first regulated control signal; and
      when the operational condition is the regular mode, the selector output signal is a function of the second regulated control signal; and
   an output module operable to receive a source voltage and to output a regulated output voltage as a function of the selector output signal, the output voltage being lower than the source voltage.

2. The voltage regulator system of claim 1, wherein:
   the biasing module comprises a bandgap reference generator unit operable to generate a bandgap reference; and
   the first reference biasing signal is generated as a function of the bandgap reference.

3. The voltage regulator system of claim 2, wherein:
   the standby detect module is further operable to generate a bias startup signal indicating the operating condition; and
   the biasing module further comprises a startup unit operable to:
      detect the bias startup signal; and
      start up the bandgap reference generator when the bias startup signal indicates that the operating condition is the standby mode.

4. The voltage regulator system of claim 2, wherein the biasing module further comprises a reference ready detect unit operable to:
   detect whether the first reference biasing signal is valid for use as a reference level; and
   when the first reference biasing signal is valid for use as a reference level, output a reference ready signal.

5. The voltage regulator system of claim 4,
wherein detecting whether the first reference biasing signal is valid for use as a reference level comprises detecting whether the first reference biasing signal is greater than a threshold level.

6. The voltage regulator system of claim 4, wherein:
the reference ready detect unit comprises a delay unit operable to provide a magnitude of delay; and
detecting whether the first reference biasing signal is valid for use as a reference level comprises waiting for a duration of time that is greater than or equal to the magnitude of delay.

7. The voltage regulator system of claim 4, wherein the standby detect module is further operable to:
receive the reference ready signal; and
output the selector input signal as a function of the operational condition only when the reference ready signal indicates that the first reference biasing signal is valid for use as a reference level.

8. The voltage regulator system of claim 4, wherein the standby detect module is further operable to:
receive the reference ready signal; and
direct the first amplifier module to start up when the reference ready signal indicates that the first reference biasing signal is valid for use as a reference level.

9. The voltage regulator system of claim 1, wherein:
the first amplifier module is further operable to generate the first regulated control signal in negative feedback as a function of the first reference biasing signal and a first feedback signal, the first feedback signal being generated as a function of the regulated output voltage.

10. The voltage regulator system of claim 9, wherein the first feedback signal is tied to the regulated output voltage.

11. The voltage regulator system of claim 1, wherein:
the second amplifier module is further operable to generate the second regulated control signal in negative feedback as a function of the second reference biasing signal and a second feedback signal, the second feedback signal being generated as a function of the regulated output voltage.

12. The voltage regulator system of claim 1, wherein the second reference biasing signal is generated as a function of an external biasing signal generated by an external biasing module communicatively coupled with the second amplifier module.

13. The voltage regulator system of claim 1, wherein the selector module comprises a multiplexer.

14. The voltage regulator system of claim 1, wherein the output module comprises a low-threshold device, having:
a gate driven as a function of the selector output signal;
a first terminal coupled with the source voltage;
a second terminal coupled with the regulated output voltage; and
the native pass transistor is a field effect transistor having a threshold voltage about equal to zero volts.

15. The voltage regulator system of claim 14, wherein the low-threshold device is a field effect transistor having a threshold voltage substantially equal to zero volts.

16. The voltage regulator system of claim 1, wherein the output module comprises a load current path, operable to be disabled when the operational condition is the standby mode.

17. The voltage regulator system of claim 1, wherein the output module comprises a bypass unit, operable to disable the output module as a function of an externally generated bypass signal.

18. The voltage regulator system of claim 1, wherein:
the first reference biasing signal provides a lower accuracy reference than the second reference biasing signal.

19. A voltage regulator system, comprising:
a biasing module, operable to generate a first reference biasing signal using a first magnitude of power;
a standby detect module, operable to detect an operational condition being selected from a group consisting of a regular mode and a standby mode, and to output a selector input signal as a function of the operational condition;
a selector module, operable to:
receive the first reference biasing signal and a second reference biasing signal, the second reference biasing signal being generated using a second magnitude of power that is higher than the first magnitude of power; and
output a selector output signal as a function of the selector input signal, such that:
when the operational condition is the standby mode, the selector output signal is a function of the first reference biasing signal; and
when the operational condition is the regular mode, the selector output signal is a function of the second reference biasing signal;
an amplifier module, operable to generate a regulated control signal as a function of the selector output signal; and
an output module operable to receive a source voltage and to output a regulated output voltage as a function of the regulated control signal, the output voltage being lower than the source voltage.

20. The voltage regulator system of claim 19, wherein:
the biasing module comprises a bandgap reference generator unit operable to generate a bandgap reference; and
the first reference biasing signal is generated as a function of the bandgap reference.

21. The voltage regulator system of claim 20, wherein:
the standby detect module is further operable to generate a bias startup signal indicating the operating condition; and
the biasing module further comprises a startup unit operable to:
detect the bias startup signal; and
start up the bandgap reference generator when the bias startup signal indicates that the operating condition is the standby mode.

22. The voltage regulator system of claim 20, wherein the biasing module further comprises a reference ready detect unit operable to:
detect whether the first reference biasing signal is valid for use as a reference level; and
when the first reference biasing signal is valid for use as a reference level, output a reference ready signal.

23. The voltage regulator system of claim 22, wherein the standby detect module is further operable to:
receive the reference ready signal; and
output the selector input signal as a function of the operational condition only when the reference ready signal indicates that the first reference biasing signal is valid for use as a reference level.

24. The voltage regulator system of claim 19, wherein:
the amplifier module is further operable to generate the regulated control signal in negative feedback as a function of the first reference biasing signal and a feedback signal, the feedback signal being generated as a function of the regulated output voltage.

25. The voltage regulator system of claim 19, wherein the second reference biasing signal is generated as a function of an external biasing signal generated by an external biasing module communicatively coupled with the selector module.

26. A method for voltage regulation, comprising:
configuring a voltage regulator to generate a regulated output voltage as a function of a second reference biasing signal;
monitoring an operational condition to detect a transition from a regular mode to a standby mode;
directing a biasing module to generate a first reference biasing signal when the transition from the regular mode to the standby mode is detected;
monitoring the first reference biasing signal to determine when the first reference biasing signal is valid for use as a reference level, the first reference biasing signal being generated using less power than used to generate the second reference biasing signal; and
when the first reference biasing signal is valid for use as a reference level, reconfiguring the voltage regulator to generate the regulated output voltage as a function of the first reference biasing signal.

27. The method of claim 26, further comprising:
when the transition from the regular mode to the standby mode is detected, using an amplifier module to generate a regulated control signal as a function of the first reference biasing signal,
wherein reconfiguring the voltage regulator to generate the regulated output voltage as a function of the first reference biasing signal comprises reconfiguring the voltage regulator to generate the regulated output voltage as a function of the regulated control signal.

28. The method of claim 26, further comprising:
using a first amplifier module to generate a first regulated control signal as a function of the first reference biasing signal; and
using a second amplifier module to generate a second regulated control signal as a function of the second reference biasing signal,
wherein configuring the voltage regulator to generate the regulated output voltage as a function of the second reference biasing signal comprises configuring the voltage regulator to generate the regulated output voltage as a function of the second regulated control signal, and
wherein reconfiguring the voltage regulator to generate the regulated output voltage as a function of the first reference biasing signal comprises reconfiguring the voltage regulator to generate the regulated output voltage as a function of the regulated control signal.

29. The method of claim 28, wherein using the second amplifier module to generate the second regulated control signal as a function of the second reference biasing signal comprises:
when the first reference biasing signal is valid for use as a reference level, directing the second amplifier module to generate the second regulated control signal as a function of the second reference biasing signal.

30. The method of claim 28, further comprising:
after reconfiguring the voltage regulator to generate the regulated output voltage as a function of the first reference biasing signal, shutting down the first amplifier module.

31. The method of claim 28, further comprising:
after reconfiguring the voltage regulator to generate the regulated output voltage as a function of the first reference biasing signal, reducing a magnitude of load current drawn by the voltage regulator.

32. The method of claim 26, further comprising:
monitoring the operational condition to detect a transition from the standby mode to the regular mode;
when the transition from the standby mode to the regular mode is detected, reconfiguring the voltage regulator to generate the regulated output voltage as a function of the second reference biasing signal; and
after reconfiguring the voltage regulator to generate the regulated output voltage as a function of the second reference biasing signal, directing the biasing module to stop generating the first reference biasing signal.

33. The method of claim 32, further comprising:
when the transition from the standby mode to the regular mode is detected, monitoring the second reference biasing signal to determine when the second reference biasing signal is valid for use as a reference level,
wherein the voltage regulator is reconfigured to generate the regulated output voltage as a function of the second reference biasing signal only when the second reference biasing signal is valid for use as a reference level.

* * * * *